July 21, 1925.
G. O. LEE
REVERSIBLE PLOW
Filed Jan. 10, 1925
1,546,844
2 Sheets-Sheet 1
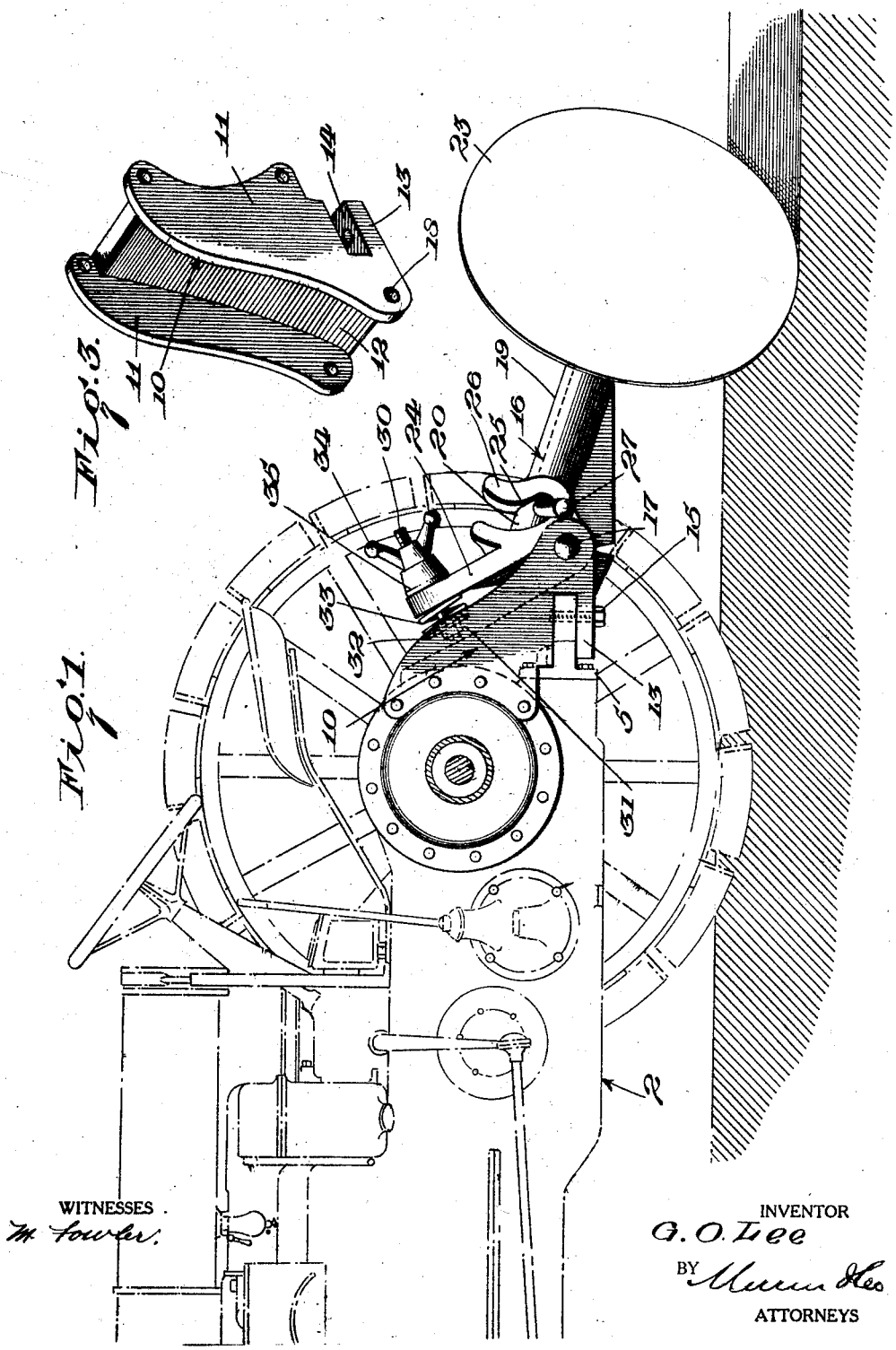
INVENTOR
G. O. Lee

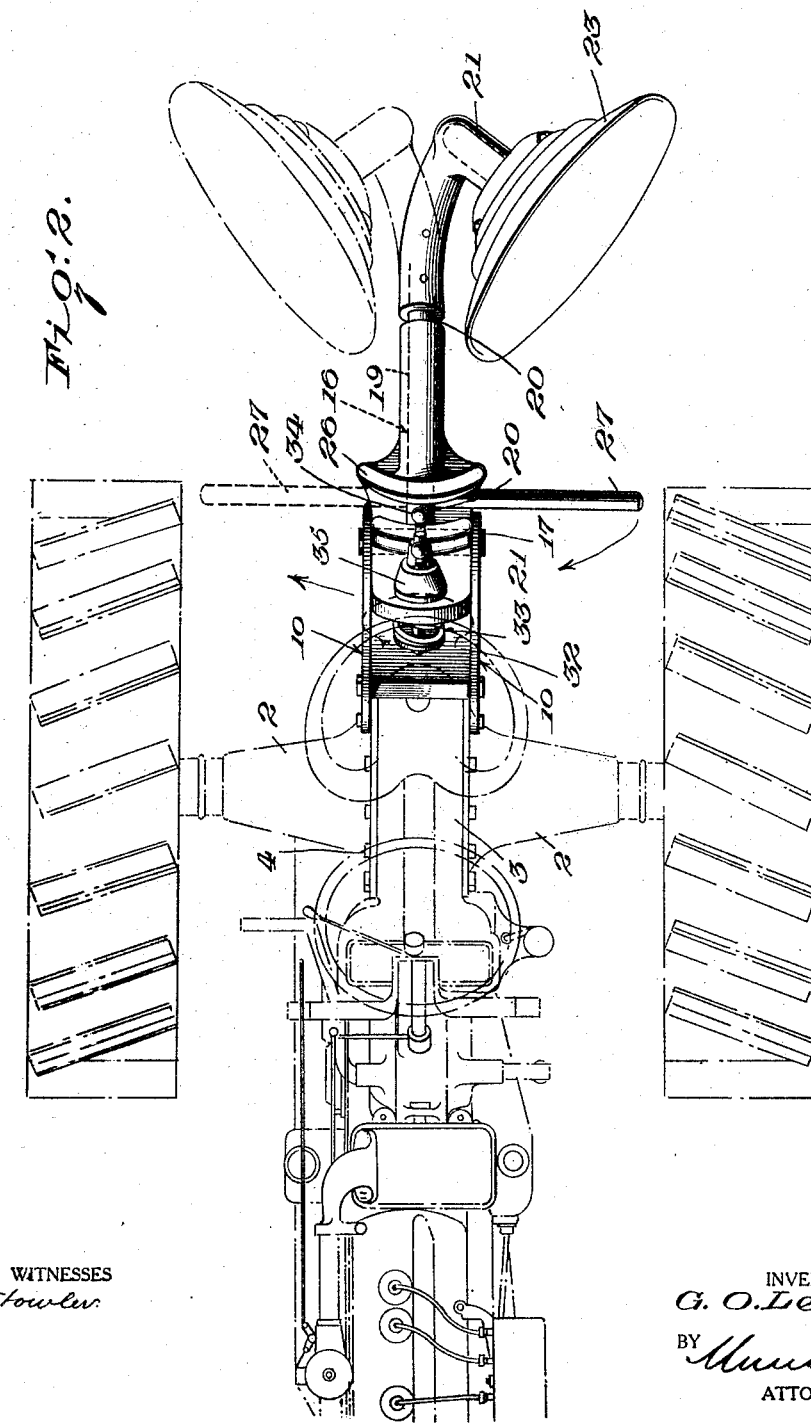

Patented July 21, 1925.

1,546,844

UNITED STATES PATENT OFFICE.

GARNETT O. LEE, OF LYNCHBURG, VIRGINIA.

REVERSIBLE PLOW.

Application filed January 10, 1925. Serial No. 1,668.

*To all whom it may concern:*

Be it known that I, GARNETT O. LEE, a citizen of the United States, and a resident of Lynchburg, in the county of Campbell and State of Virginia, have invented certain new and useful Improvements in Reversible Plows, of which the following is a specification.

This invention aims to provide a reversible plow for use on tractors.

One of the principal objects of the invention is the provision of a plow of this character, wherein the plow proper will be maintained in the ground to the proper depth but in which the plow proper may be readily reversed.

A further object is the provision of a plow wherein cushioning or shock absorbing means is provided to prevent breakage of any of the various parts of the plow.

A still further object is the provision of a plow of this character which is so organized with the tractor as to prevent the same from tilting or bucking up backwardly.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary view in side elevation showing a tractor equipped with the present invention, Figure 2 is a fragmentary plan view of the arrangement shown in Figure 1, and Figure 3 is a detail perspective view of the mounting bracket.

Referring to the drawings, the numeral 1 designates generally a tractor. The tractor includes the usual rear axle housing sections 2 and differential housing 3, these parts being bolted together by bolts 4. The usual draw bar hitch 5 is also provided on the tractor.

The present invention proposes the use of a mounting and attaching bracket designated generally at 10 which has side plates 11 secured to the axle housing sections 2 and the differential housing 3 by the bolts 4. A transverse web 12 connects the plates 11. A forwardly extending lip 13 is provided on the bracket 10 and is designed to provide a slot 14 in which the draw bar hitch 5 is snugly fitted. Bolts 15 are provided to secure the lip 13 to the draw bar hitch 5 as shown in Figure 1.

A plow carrier designated generally at 16 is provided and is pivotally mounted on the plates 11 by means of a pivot bolt 17 which extends through pivot holes 18 provided in the plates 11, and through a pivot opening provided in the plow carrier 16. The plow carrier 16 includes a sleeve 19, the inner periphery of which is formed to constitute a bearing for an oscillatable shaft 20, the shaft 20 being fitted in the sleeve 19 and projecting rearwardly from the sleeve. To the projecting portion of the shaft 20 a plow carrying arm 21 is secured. The plow carrying arm is curved and bent as shown in Figure 2, and carries at its outer end a plow 23. The plow proper 23 is located at an angle to the line of draft, and is offset to one side of the center of the tractor in either of its positions. At its forward end the sleeve 16 merges into an arm 24 which extends at an angle to the sleeve. The juncture of the arm 24 and the sleeve 19 is enlarged and is formed with a curved slot 25 along the edges of which flanges or ribs 26 are provided. An operating rod 27 is fixed to the shaft 20 and extends out through the slot 25. This slot 25 has the general curvature of an arc so that when the rod 27 is grasped and moved, the shaft 20 will not only be turned but also moved longitudinally a short distance. When the rod 27 is engaged in either end of the slot 25 it is effectively held in position against accidental movement. In fact, it is necessary for the operator to grasp the rod 27 and apply considerable force thereto to reverse the plow 23.

At the upper end of the arm 24 a bolt 30 is slidably fitted in an opening provided in the arm. This bolt is formed with a head 31 which is designed to engage the web 12 of the bracket 10. A washer 32 engages the head 31 and this washer is engaged by one end of the coil spring 33, the other end of which coil spring engages the arm 24. On the opposite side of the arm 24 from the spring 33, a wing nut 34 is threaded on the bolt 30 and between the wing nut 34 and the arm 24 a washer 35 is positioned. Of course a coil spring may be substituted for the washer 35 if found desirable. With the arrangement shown, the plow may move upwardly to some extent as for instance, when striking a stone, rock or the like. This prevents breakage of the plow. It is to be understood that upward movement of the plow is permitted by reason of the fact that the plow carrier 16 is pivotally mounted on the bracket 10 and may partake of the pivotal movement when the spring 33 is compressed. Of course, the spring 33 is of sufficient strength to resist compression under normal plowing conditions, and only comes into action to prevent breakage of the parts of the plow.

While this plow may preferably be a disk as shown, any suitable form of plow proper may be used without departure from some of the principles of my invention.

I claim:—

1. In a reversible plow for use on tractors, a bracket adapted to be secured to the tractor, a plow carrier pivotally mounted on the bracket and including a sleeve and an arm, spring means cooperable with the arm and the bracket for yieldably holding the plow carrier in position, a shaft rotatably mounted in the sleeve, means for adjusting the shaft and holding the same in adjusted position, a curved plow carrying arm connected with the shaft, and a plow carried by the curved plow carrying arm.

2. In a reversible plow for use on tractors, having a rear axle housing and differential housing bolted together and having a draw bar hitch, a bracket having plates adapted to be bolted to the rear axle housing and the differential housing and having a lip underlying the draw bar hitch, means for securing the lip to the draw bar hitch, and a plow carrier connected with the bracket.

3. In a reversible plow for use on tractors, having a rear axle housing and differential housing bolted together and having a draw bar hitch, a bracket having plates adapted to be bolted to the rear axle housing and the differential housing and having a lip underlying the draw bar hitch, means for securing the lip to the draw bar hitch, said bracket also including a web connecting the plates, a plow carrier pivotally mounted on the plates and including a sleeve and an arm, yieldable means cooperable with the web and the arm for holding the plow carrier in one position, a shaft rotatably mounted on the sleeve, means for adjusting and holding the shaft in adjusted position, and a plow connected with the shaft.

4. In a reversible plow for use on tractors, a bracket, a plow carrier pivotally mounted on the bracket and including an arm and sleeve, yieldable means cooperable with the arm and the sleeve for holding the plow carrier in one position, said yieldable means including a bolt engageable with the bracket and slidably mounted on the arm, and a spring for resisting sliding movement of the bolt, a shaft mounted in the sleeve, means for adjusting the shaft and holding the same in adjusted position, and a plow connected with the shaft.

5. In a reversible plow for use on tractors, a plow carrier including a sleeve and having an arcuate slot, the center of the arc of the slot being slightly forward of the two ends thereof, a shaft rotatably mounted in the sleeve, said shaft being also mounted in the sleeve for a slight longitudinal movement with respect thereto a plow connected to one end of the shaft, and a rod connected to the shaft and operating in the arcuate slot.

GARNETT O. LEE.